(12) United States Patent
Mashita et al.

(10) Patent No.: US 11,773,287 B2
(45) Date of Patent: Oct. 3, 2023

(54) METHOD FOR FORMING COATING

(71) Applicant: TOKYO OHKA KOGYO CO., LTD., Kawasaki (JP)

(72) Inventors: Shunichi Mashita, Kawasaki (JP); Yoshihiro Sawada, Kawasaki (JP)

(73) Assignee: Tokyo Ohka Kogyo Co., Ltd., Kawasaki (JP)

( * ) Notice: Subject to any disclaimer, the term of this patent is extended or adjusted under 35 U.S.C. 154(b) by 549 days.

(21) Appl. No.: 16/872,910

(22) Filed: May 12, 2020

(65) Prior Publication Data

US 2020/0369914 A1 Nov. 26, 2020

(30) Foreign Application Priority Data

May 24, 2019 (JP) ................. 2019-098089

(51) Int. Cl.
*C09D 179/02* (2006.01)
*C08G 73/02* (2006.01)

(52) U.S. Cl.
CPC ....... *C09D 179/02* (2013.01); *C08G 73/0213* (2013.01)

(58) Field of Classification Search
None
See application file for complete search history.

(56) References Cited

U.S. PATENT DOCUMENTS

| | | | | |
|---|---|---|---|---|
| 3,533,851 A * | 10/1970 | Adlhart | ............... | H01M 8/0239 502/101 |
| 3,709,710 A * | 1/1973 | Edgar et al. | ............ | C08K 9/02 106/441 |
| 4,231,851 A * | 11/1980 | Mengoli | ............. | C09D 5/4469 205/235 |
| 5,275,645 A * | 1/1994 | Ternoir | ................ | C09D 183/04 106/287.19 |
| 8,134,150 B2 * | 3/2012 | Mitzi | ................... | C23C 18/143 257/42 |
| 8,975,815 B2 * | 3/2015 | Prat | .................... | H01L 27/3276 313/511 |
| 2006/0223008 A1 | 10/2006 | Yoshimura et al. | | |
| 2008/0022896 A1 | 1/2008 | Karkkainen | | |
| 2015/0252222 A1 | 9/2015 | Ozaki et al. | | |
| 2017/0190139 A1 * | 7/2017 | Haghdoost | ........... | C09D 5/1681 |

FOREIGN PATENT DOCUMENTS

| | | |
|---|---|---|
| JP | H09-225382 A | 2/1992 |
| JP | H04-055483 A | 9/1997 |
| JP | 2005-213491 A | 8/2005 |
| JP | 2006-259382 A | 9/2006 |
| JP | 2008-503331 A | 2/2008 |
| JP | 5002803 B2 | 8/2012 |
| JP | 2014-077082 A | 5/2014 |

OTHER PUBLICATIONS

English abstract CN 109575909 A, China, Apr. 5, 2019.*

\* cited by examiner

*Primary Examiner* — Tae H Yoon
(74) *Attorney, Agent, or Firm* — Knobbe, Martens, Olson & Bear, LLP

(57) ABSTRACT

A method for forming a coating that is less uneven and more uniform, and has good stability after being formed, by applying a coating-forming composition including a metal compound and/or a halogen-containing compound. The coating is formed by a method including forming a coating by applying a coating-forming composition onto a substrate. The coating-forming composition is a solution including a metal compound and/or a halogen-containing compound, and an amine compound. The metal compound includes one or more metal elements selected from period 2 elements to period 6 elements in the periodic table.

6 Claims, No Drawings

METHOD FOR FORMING COATING

RELATED APPLICATION

This application claims the benefit of priority from Japanese Patent Application No. 2019-098089, filed on 24 May 2019, the content of which is incorporated herein by reference.

BACKGROUND OF THE INVENTION

Field of the Invention

The present invention relates to a method for forming a coating including a metal compound (A1) and/or a halogen-containing compound (A2).

Related Art

It is widely known that metal compounds, halogen-containing compounds, and the like have a function as e.g. a surface modifier such as a liquid-repellent agent, a catalytic function, and the like. Therefore, metal compounds, halogen-containing compounds, and the like are thinly coated on the surfaces of not only substrates but also various articles, which can be used.

For formation of a coating including a metal compound, a method for forming a coated film by applying a solution including one or two or more metal compounds selected from metal compounds including Ni, metal compounds including Co, and metal compounds including Fe onto the surface of a substrate including Si is known as a pretreatment for forming, for example, a diamond-like carbon film (see Patent Document 1).

Patent Document 1: Japanese Patent No. 5002803

SUMMARY OF THE INVENTION

However, when a coated film is formed by applying a liquid composition including a metal compound, a halogen-containing compound, and the like, particles derived from components included in the composition are generated depending on the constitution of the liquid composition, and accordingly a uniform coating having less unevenness in e.g. thickness is not easily formed and the formed coating has low stability in some cases.

The present invention was made in view of the above problem, and an object thereof is to provide a method for forming a coating, the method being able to form a coating, being less uneven and uniform and having good stability after formed, by applying a coating-forming composition including a metal compound and/or a halogen-containing compound.

The present inventors found that the above problem could be solved by, when forming a coating including a metal compound (A1) and/or a halogen-containing compound (A2), adding an amine compound (B) to a coating-forming liquid composition including a metal compound (A1) and/or a halogen-containing compound (A2) and applying the coating-forming liquid composition to form a coating, thereby completing the present invention.

More preferably, the present invention relates to a method for forming a coating, the method including: a step of forming a coating by applying a coating-forming composition onto a substrate, wherein the composition is a solution including a metal compound (A1) and/or a halogen-containing compound (A2), and an amine compound (B), and the metal compound (A1) includes one or more metal elements selected from period 2 elements to period 6 elements in the periodic table.

According to the present invention, it is possible to provide a method for forming a coating, the method being able to form a coating, being less uneven and uniform and having good stability after formed, by applying a coating-forming composition including a metal compound and/or a halogen-containing compound.

DETAILED DESCRIPTION OF THE INVENTION

The method for forming a coating is a method including a step of forming a coating by applying a coating-forming composition onto a substrate. The coating-forming composition is a solution including a metal compound (A1) and/or a halogen-containing compound (A2), and an amine compound (B). The metal compound (A1) includes one or more metal elements selected from period 2 elements to period 6 elements in the periodic table.

By using a solution including a metal compound (A1) and/or a halogen-containing compound (A2), and an amine compound (B) as a coating-forming composition, a coating, being less uneven and uniform and having good stability after formed, can be formed.

The coating-forming composition and the method for forming a coating will now be described.

<<Coating-Forming Composition>>

The coating-forming composition is a solution including a metal compound (A1) and/or a halogen-containing compound (A2), and an amine compound (B). Hereinafter, the coating-forming composition will be simply referred to as "composition".

Essential or optional components included in the composition will now be described.

[Metal Compound (A1)]

The metal compound (A1) includes one or more metal elements selected from period 2 elements to period 6 elements in the periodic table. The period 2 elements to period 6 elements in the periodic table are specifically Li, Be, Na, Mg, Al, K, Ca, Sc, Ti, V, Cr, Mn, Fe, Co, Ni, Cu, Zn, Ga, Rb, Sr, Y, Zr, Nb, Mo, Tc, Ru, Rh, Pd, Ag, Cd, In, Sn, Cs, Ba, La, Ce, Pr, Nd, Pm, Sm, Eu, Gd, Tb, Dy, Ho, Er, Tm, Yb, Lu, Hf, Ta, W, Re, Os, Ir, Pt, Au, Hg, Tl, Pb, Bi and Po.

Because of, for example, ease of acquiring a metal compound (A1), it is preferred that the metal compound (A1) include one or more metal elements selected from the group consisting of Ga, Al, Mg, Hf, Ti, W, Co, Fe, Mo, Ta, In, Sn, Zn, Cu, Ni, Ru, Mn, K, Li, Na, Ca, Sr, Ba, La, Bi and Zr.

Because, for example, the preparation of a solution is easy, it is preferred that the composition include an organometallic compound or a metal hydroxide as a metal compound (A1). The organometallic compound is not particularly limited as long as it is a compound including an organic group and a metal element. The organometallic compound may be a metal salt of an organic acid or organometallic complex. As the organometallic compound, one or more selected from the group consisting of metal alkoxides, alkyl metal compounds and organometallic complexes are preferable.

When the organometallic compound is an organometallic complex, examples of organic ligands include carbon monoxide, alkanol amines, carboxylic acids, hydroxycarboxylic acids (salts), β-diketones, β-ketoesters, diols and amino acids, and the like. In addition, the organometallic complex may be so-called metallocene.

Specific examples of alkanol amines include ethanolamine, diethanolamine and triethanolamine. Specific examples of carboxylic acids include acetic acid, propionic acid and butyric acid. Specific examples of hydroxycarboxylic acids (salts) include glycolic acid, lactic acid, malic acid, citric acid, tartaric acid and salicylic acid, and salts thereof. Specific examples of β-diketones include acetylacetone, 2,4-hexanedione and 2,4-heptanedione. Specific examples of β-ketoesters include methyl acetoacetate, ethyl acetoacetate, n-propyl acetoacetate, isopropyl acetoacetate and n-butyl acetoacetate. Specific examples of diols include ethylene glycol, diethylene glycol, 3-methyl-1,3-butanediol, triethylene glycol, dipropylene glycol, 1,3-propanediol, 1,3-butanediol, 1,5-pentanediol, hexylene glycol and octylene glycol, and the like.

Specific examples of ligands in cases where the organometallic complex is metallocene include cyclopentadiene, methylcyclopentadiene, 1,2-dimethylcyclopentadiene, 1,2,3-trimethylcyclopentadiene, 1,2,4-trimethylcyclopentadiene, 1,2,3,4-tetramethylcyclopentadiene, tert-butylcyclopentadiene, ethylcyclopentadiene, phenylcyclopentadiene, trimethylsilylcyclopentadiene, 1,2-dimethyl-4-ethylcyclopentadiene, 1,2-dimethyl-4-tert-butylcyclopentadiene, 1,2-dimethyl-4-trimethylsilylcyclopentadiene, naphthylcyclopentadiene, indene, 4-phenylindene, 1-methylindene, 2-methylindene, 2-ethylindene, 2-propylindene, 2-phenylindene, 2-trimethylsilylindene, 4-methylindene, 5-methylindene, 2,4-dimethylindene, 2-methyl-4-isopropylindene, 2-methyl-4-phenylindene, 2-ethyl-4-phenylindene, 2-methyl-4-(1-naphthyl)indene, 2-ethyl-4-(1-naphthyl)indene, 2-propyl-4-(1-naphthyl)indene, 2-methyl-4-(9-phenanthryl)indene, 2-ethyl-4-(9-phenanthryl) indene, 2-propyl-4-(9-phenanthryl)indene, 2,4,7-trimethylindene, 4,5,6,7-tetrahydroindene, 2-methyl-4,5,6,7-tetrahydroindene and fluorene, and the like.

When the organometallic complex is a metal carbonyl having carbon monoxide as a ligand, examples of metal carbonyls include $Ti(Co)_7$, $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_3(CO)_{12}$, $Fe_2(CO)_9$, $Ru(CO)_5$, $Ru_3(CO)_{12}$, $Os(CO)_5$, $Os_3(CO)_{12}$, $Co_4(CO)_{12}$, $CO_2(CO)_8$, $Rh_4(CO)_{12}$, $Rh_6(CO)_{16}$, $Ir_4(CO)_{12}$ and $Ni(CO)_4$.

Specific examples of alkyl metal compounds include trimethylaluminum, triethylaluminum, tri-n-propylaluminum, tri-n-butylaluminum, trimethylgallium, triethylgallium, tri-n-propylgallium, tri-n-butylgallium, trimethylindium, triethylindium, tri-n-propylindium, tri-n-butylindium, dimethylzinc, diethylzinc, tetramethyltin and tetraethyltin, and the like.

As preferred examples of the metal compound (A1) except for the above, titanium compounds, zirconium compounds and aluminum compounds will now be described.

Examples of titanium compounds include tetraalkoxytitanium such as tetramethoxytitanium, tetraethoxytitanium, tetra-n-propoxytitanium, tetraisopropoxytitanium, tetra-n-butoxytitanium, tetraisobutoxytitanium, diisopropoxydi-n-butoxytitanium, di-t-butoxydiisopropoxytitanium, tetra-tert-butoxytitanium, tetraisooctyloxytitanium and tetrastearyloxytitanium; alkanol amine-titanium chelate compounds such as diisopropoxytitanium bis(diethanolaminate), triisopropoxytitanium mono(diethanolaminate), di-n-butoxytitanium bis(diethanolaminate), dimethoxytitanium bis(triethanolaminate), diethoxytitanium bis(triethanolaminate), diisopropoxytitanium bis(triethanolaminate), triisopropoxytitanium mono(triethanolaminate) and di-n-butoxytitanium bis(triethanolaminate); β-diketone chelate-alkoxytitanium compounds such as dimethoxytitanium bis(acetylacetonate), diethoxytitanium bis(acetylacetonate), diisopropoxytitanium bis(acetylacetonate), di-n-propoxytitanium bis(acetylacetonate) and di-n-butoxytitanium bis(acetylacetonate); β-ketoester-titanium chelate compounds such as diisopropoxytitanium bis(ethylacetoacetate); and diol-titanium chelate compounds such as dioctyloxytitanium bis(octyleneglycolate).

Examples of zirconium compounds include tetraalkoxyzirconium such as tetramethoxyzirconium, tetraethoxyzirconium, tetra-n-propoxyzirconium, tetraisopropoxyzirconium, tetra-n-butoxyzirconium, tetraisobutoxyzirconium, diisopropoxydi-n-butoxyzirconium, di-tert-butoxydiisopropoxyzirconium, tetra-tert-butoxyzirconium, tetraisooctyloxyzirconium and tetrastearyloxyzirconium; alkanol amine-zirconium chelate compounds such as zirconium tetrakis(diethanolaminate), isopropoxyzirconium tris(diethanolaminate), diisopropoxyzirconium bis(diethanolaminate), triisopropoxyzirconium mono(diethanolaminate), dibutoxyzirconium bis(diethanolaminate), zirconium tetrakis(triethanolaminate), dimethoxyzirconium bis(triethanolaminate), diethoxyzirconium bis(triethanolaminate), isopropoxyzirconium tris(triethanolaminate), diisopropoxyzirconium bis(triethanolaminate), triisopropoxyzirconium mono(triethanolaminate) and di-n-butoxyzirconium bis(triethanolaminate); β-diketone-zirconium chelate compounds such as tri-n-butoxyzirconium mono(acetylacetonate) and di-n-butoxyzirconium bis(acetylacetonate); and β-ketoester-zirconium chelate compounds such as dibutoxyzirconium bis(ethylacetoacetate).

Examples of aluminum compounds include trialkoxyaluminum such as trimethoxyaluminum, triethoxyaluminum, tri-n-propoxyaluminum, triisopropoxyaluminum and tri-n-butoxyaluminum; β-diketone-aluminum chelate compounds such as dimethoxyaluminum mono(acetylacetonate), diethoxyaluminum mono(acetylacetonate), di-n-propoxyaluminum mono(acetylacetonate), diisopropoxyaluminum mono(acetylacetonate), di-n-butoxyaluminum mono(acetylacetonate), monomethoxyaluminum bis(acetylacetonate), monoethoxyaluminum bis(acetylacetonate), mono-n-propoxyaluminum bis(acetylacetonate), monoisopropoxyaluminum bis(acetylacetonate) and mono-n-butoxyaluminum bis(acetylacetonate); β-ketoester-aluminum chelate compounds such as dimethoxyaluminum mono(ethylacetoacetate), diethoxyaluminum mono(ethylacetoacetate), di-n-propoxyaluminum mono(ethylacetoacetate), diisopropoxyaluminum mono(ethylacetoacetate), di-n-butoxyaluminum mono(ethylacetoacetate), monomethoxyaluminum bis(ethylacetoacetate), monoethoxyaluminum bis(ethylacetoacetate), mono-n-propoxyaluminum bis(ethylacetoacetate), monoisopropoxyaluminum bis(ethylacetoacetate) and mono-n-butoxyaluminum bis(ethylacetoacetate); aluminum complexes such as aluminum tris(acetylacetonate), aluminum tris(ethylacetoacetate) and aluminum tris(methylacetoacetate).

Suitable examples of metal hydroxides include aluminum hydroxide.

[Halogen-Containing Compound (A2)]

The halogen-containing compound (A2) is not particularly limited as long as the compound includes a halogen atom and is soluble in the composition. As the halogen-containing compound (A2), a halogenated organic compound and a halogen-containing silane compound are preferable. As the halogen atom in the halogen-containing compound (A2), one or more selected from the group consisting of F, I and Br are preferable.

The amount of the metal compound (A1) and/or halogen-containing compound (A2) included in the composition is not particularly limited. The amount of the metal compound (A1) and/or halogen-containing compound (A2) included in the composition is preferably 0.01 mass % or more 20 mass % or less, more preferably 0.02 mass % or more 5 mass % or less, and particularly preferably 0.03 mass % or more 1 mass % or less.

[Amine Compound (B)]

The composition includes an amine compound (B). The number of nitrogen atoms in the amine compound (B) is not particularly limited. The amine compound (B) is, for example, preferably a compound having 1 or more 10 or less nitrogen atoms, and more preferably a compound having 1 or more 5 or less nitrogen atoms. In addition, the amine compound (B) has preferably 2 or more nitrogen atoms because a desired effect is easily obtained using the amine compound (B). The amine compound (B) may be an aliphatic amine, an aromatic amine having an aromatic group bound to the amino group, or a nitrogen-containing heterocyclic compound having a nitrogen atom as a ring atom. Herein, an amine compound not having an aromatic group is considered an aliphatic amine.

Specific examples of aliphatic amines include primary amine compounds such as methylamine, ethylamine, 2-aminoethanol, ethylenediamine, n-propylamine, isopropylamine, 1,3-propanediamine, 1,2-propanediamine, 3,3-diaminodipropylamine, 3-amino-1-propanol, isopropanolamine, 2-methoxyethylamine, allylamine, n-butylamine, isobutylamine, sec-butylamine, tert-butylamine, 1,4-diaminobutane, n-pentylamine, isoamylamine, neopentylamine, n-hexylamine, hexamethylenediamine, n-octylamine, sec-octylamine, 2-ethylhexylamine, n-decylamine, laurylamine, stearylamine, tetradecylamine, cetylamine, cyclopropylamine, cyclopentylamine, cyclohexylamine, cycloheptylamine, cyclooctylamine and cyclododecylamine; secondary amine compounds such as dimethylamine, diethylamine, diethanolamine, di-n-propylamine, diisopropylamine, diisopropanolamine, diallylamine, di-n-decylamine, n-decylmethylamine and dicyclohexylamine; and tertiary amine compounds such as trimethylamine, triethylamine, triethanolamine, tri-n-propylamine, triisopropylamine, triisopropanolamine, tri-n-butylamine and tri-n-hexylamine.

Specific examples of aromatic amines include aniline, 1-aminonaphthalene, benzylamine, 2-chlorobenzylamine, cumylamine, diphenylamine, N,N-dimethylaniline, tribenzylamine and triphenylamine, and the like.

Specific examples of nitrogen-containing heterocyclic compounds include pyrrolidine compounds, piperidine compounds, imidazole compounds, pyrrole compounds, pyridine compounds and pyrimidine compounds, and the like.

Among the above amine compounds (B), an aliphatic amine is preferable because a desired effect is easily obtained by adding it to the composition.

Among the aliphatic amines, preferred are aliphatic amines, in which, when the number of primary amino groups therein, the number of secondary amino groups therein and the number of tertiary amino groups therein are NA, NB and NC respectively, NA, NB and NC satisfy the following formulas (1) and (2):

$$(NB+NC) \geq 1 \quad (1)$$

$$(NA+NB+NC) \geq 2 \quad (2).$$

The composition includes together with a metal compound (A1) and/or a halogen-containing compound (A2) an aliphatic amine satisfying the above predetermined conditions, thereby particularly easily forming a coating with good stability over time using the composition.

It should be noted that, in the case of NB+NC<NA, a primary amino group is bound to an aliphatic hydrocarbon group having 2 or less carbon atoms in an aliphatic amine. When a primary amino group with less steric hindrance is bound to a relatively long aliphatic hydrocarbon group, the degree of steric freedom of the primary amino group is high. In addition, in the case of NB+NC<NA, an amine compound has two or more primary amino groups. A detailed reason is unclear; however, it is thought that a number of primary amino groups having a high degree of steric freedom exist, thereby easily causing some kind of adverse effect on film-forming properties and film stability. On the other hand, it is thought that an aliphatic amine satisfying the above formula (1) and formula (2) further satisfies the above conditions on the primary amino group, thereby not easily causing an adverse effect on film-forming properties and film stability.

The aliphatic amine may be a linear or branched aliphatic amine or an aliphatic amine having a cyclic skeleton. Because a desired effect is easily obtained using an aliphatic amine, the aliphatic amine is preferably a linear or branched aliphatic amine compound.

The aliphatic amine may include a carbon-carbon unsaturated bond. It is preferred that the aliphatic amine not include a carbon-carbon unsaturated bond from the viewpoint of, for example, the stability of the composition.

The aliphatic amine is preferably an amine compound, satisfying the above conditions on NA, NB and NC, and represented by the following formula (B1):

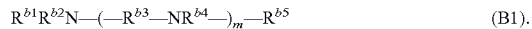

$$R^{b1}R^{b2}N—(—R^{b3}—NR^{b4}—)_m—R^{b5} \quad (B1).$$

In the formula (B1), $R^{b1}$, $R^{b2}$, $R^{b4}$ and $R^{b5}$ are each independently a hydrogen atom, an alkyl group having 1 or more 6 or less carbon atoms, or a hydroxyalkyl group having 1 or more 6 or less carbon atoms. $R^{b3}$ is an alkylene group having 1 or more 6 or less carbon atoms. m is an integer of 1 or more 5 or less and preferably an integer of 1 or more 3 or less. When m is an integer of 2 or more 5 or less, a plurality of $R^{b3}$s may be the same or different, and a plurality of $R^{b4}$s may be the same or different. In the formula (B1), optional two groups selected from the group consisting of $R^{b1}$, $R^{b2}$, $R^{b4}$ and $R^{b5}$ may be bound to each other to form a ring. In addition, the amine compound represented by the formula (B1) may include two rings.

The number of carbon atoms in an alkyl group as $R^{b1}$, $R^{b2}$, $R^{b4}$ and $R^{b5}$ is 1 or more 6 or less, and preferably 1 or more 4 or less. Specific examples of alkyl groups as $R^{b1}$, $R^{b2}$, $R^{b4}$ and $R^{b5}$ include a methyl group, an ethyl group, an n-propyl group, an isopropyl group, an n-butyl group, an isobutyl group, a sec-butyl group, a tert-butyl group, an n-pentyl group and an n-hexyl group. Among these, a methyl group, an ethyl group, an n-propyl group, an isopropyl group, an n-butyl group, an isobutyl group, a sec-butyl group and a tert-butyl group are preferable.

The number of carbon atoms in a hydroxyalkyl group as $R^{b1}$, $R^{b2}$, $R^{b4}$ and $R^{b5}$ is 1 or more 6 or less and preferably 1 or more 4 or less. Specific examples of hydroxyalkyl groups as $R^{b1}$, $R^{b2}$, $R^{b4}$ and $R^{b5}$ include a hydroxymethyl group (methylol group), a 2-hydroxyethyl group, a 3-hydroxy-n-propyl group, a 4-hydroxy-n-butyl group, a 5-hydroxy-n-pentyl group and a 6-hydroxy-n-hexyl group. Among these, a 2-hydroxyethyl group and a 3-hydroxy-n-propyl group are preferable.

The number of carbon atoms in an alkylene group as $R^{b3}$ is 1 or more 6 or less and preferably 1 or more 4 or less. Specific examples of alkylene groups as $R^{b3}$ include a methylene group, an ethane-1,2-diyl group, an ethane-1,1-diyl group, a propane-1,3-diyl group, a propane-1,2-diyl group, a propane-1,1-diyl group, a butane-1,4-diyl group, a pentane-1,5-diyl group and a hexane-1,6-diyl group. Among these, a methylene group, an ethane-1,2-diyl group and a propane-1,3-diyl group are preferable.

Suitable specific examples of the amine compound (B) include N-alkylalkanediamines such as N-methylethylenediamine, N-ethylethylenediamine, N-n-propylethylenediamine, N-isopropylethylenediamine, N-n-butylethylenediamine, N-isobutylethylenediamine, N-sec-butylethylenediamine, N-tert-butylethylenediamine, N-methyl-1,3-propanediamine, N-ethyl-1,3-propanediamine, N-n-propyl-1,3-propanediamine, N-isopropyl-1,3-propanediamine, N-n-butyl-1,3-propanediamine, N-isobutyl-1,3-propanediamine, N-sec-butyl-1,3-propanediamine and N-tert-butyl-1,3-propanediamine; N,N-dialkylalkanediamines such as N,N-dimethylethylenediamine, N,N-diethylethylenediamine, N,N-di-n-propylethylenediamine, N,N-diisopropylethylenediamine, N,N-di-n-butylethylenediamine, N,N-diisobutylethylenediamine, N,N-di-sec-butylethylenediamine, N,N-di-tert-butylethylenediamine, N,N-dimethyl-1,3-propanediamine, N,N-diethyl-1,3-propanediamine, N,N-di-n-propyl-1,3-propanediamine, N,N-diisopropyl-1,3-propanediamine, N,N-di-n-butyl-1,3-propanediamine, N,N-diisobutyl-1,3-propanediamine, N,N-di-sec-butyl-1,3-propanediamine and N,N-di-tert-butyl-1,3-propanediamine; N,N'-dialkylalkanediamines such as N,N'-dimethylethylenediamine, N,N'-diethylethylenediamine, N,N'-di-n-propylethylenediamine, N,N'-diisopropylethylenediamine, N,N'-di-n-butylethylenediamine, N,N'-diisobutylethylenediamine, N,N'-di-sec-butylethylenediamine, N,N'-di-tert-butylethylenediamine, N,N'-dimethyl-1,3-propanediamine, N,N'-diethyl-1,3-propanediamine, N,N'-di-n-propyl-1,3-propanediamine, N,N'-diisopropyl-1,3-propanediamine, N,N'-di-n-butyl-1,3-propanediamine, N,N'-diisobutyl-1,3-propanediamine, N,N'-di-sec-butyl-1,3-propanediamine and N,N'-di-tert-butyl-1,3-propanediamine; aliphatic amines having 3 or more nitrogen atoms such as diethylenetriamine, triethylenetetramine, tetraethylenepentamine, 3,3-diaminodipropylamine, N,N'-bis(3-aminopropyl)ethylenediamine, N,N'-bis(3-aminopropyl)-1,3-propanediamine, tris(2-aminoethyl)amine, and tris(3-aminopropyl)amine, N-(2-aminoethyl)piperazine, and N-(3-aminopropyl)piperazine; hydroxyalkylamines such as N-(2-aminoethyl)ethanolamine, N,N-bis(2-aminoethyl)ethanolamine, N,N-bis(2-hydroxyethyl)ethylenediamine, N-(3-aminopropyl)ethanolamine, N,N-bis(3-aminopropyl)ethanolamine and N,N-bis(2-hydroxyethyl)-1,3-propanediamine; and aliphatic diamines having a cyclic skeleton such as piperazine, N-methylpiperazine and N-ethylpiperazine.

The amine compounds (B) may be used alone or two or more amine compounds may be used in combination.

The amount of the amine compound (B) included in the composition is not particularly limited as long as a desired effect is obtained using the amine compound (B). The amount of the amine compound (B) included in the composition is preferably 0.01 mass % or more 20 mass % or less, more preferably 0.02 mass % or more 5 mass % or less, and particularly preferably 0.03 mass % or more 1 mass % or less.

[Organic solvent (S)]

The composition commonly includes an organic solvent (S) as a solvent so that a thin coating can be formed. The type of organic solvent (S) is not particularly limited as long as the object of the present invention is not defeated.

Specific examples of the organic solvent (S) include monoethers of glycols such as ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, diethylene glycol monopropyl ether, diethylene glycol monobutyl ether, diethylene glycol monophenyl ether, dipropylene glycol monomethyl ether, dipropylene glycol monoethyl ether, dipropylene glycol monopropyl ether, dipropylene glycol monobutyl ether, dipropylene glycol monophenyl ether, triethylene glycol monomethyl ether, triethylene glycol monoethyl ether, tripropylene glycol monomethyl ether and tripropylene glycol monoethyl ether; monoethers such as diisopentyl ether, diisobutyl ether, benzyl methyl ether, benzyl ethyl ether, dioxane, tetrahydrofuran, anisole, perfluoro-2-butyltetrahydrofuran and perfluorotetrahydrofuran; chain diethers of glycols such as ethylene glycol dimethyl ether, ethylene glycol diethyl ether, ethylene glycol dipropyl ether, ethylene glycol dibutyl ether, propylene glycol dimethyl ether, propylene glycol diethyl ether, propylene glycol dipropyl ether, propylene glycol dibutyl ether, diethylene glycol dimethyl ether, diethylene glycol diethyl ether, diethylene glycol dipropyl ether, diethylene glycol dibutyl ether, dipropylene glycol dimethyl ether, dipropylene glycol diethyl ether, dipropylene glycol dipropyl ether and dipropylene glycol dibutyl ether; cyclic diethers such as 1,4-dioxane; ketones such as 1-octanone, 2-octanone, 1-nonanone, 2-nonanone, acetone, 2-heptanone, 4-heptanone, 1-hexanone, 2-hexanone, 3-pentanone, diisobutyl ketone, cyclohexanone, methylcyclohexanone, phenylacetone, methyl ethyl ketone, methyl isobutyl ketone, ethyl isobutyl ketone, acetylacetone, acetonylacetone, ionone, diacetonyl alcohol, acetylcarbinol, acetophenone, methyl naphthyl ketone and isophorone; esters such as methyl acetate, butyl acetate, ethyl acetate, isopropyl acetate, pentyl acetate, isopentyl acetate, methoxyethyl acetate, ethoxyethyl acetate, ethylene glycol monomethyl ether acetate, ethylene glycol monoethyl ether acetate, ethylene glycol monopropyl ether acetate, ethylene glycol monobutyl ether acetate, ethylene glycol monophenyl ether acetate, propylene glycol monomethyl ether acetate, propylene glycol monoethyl ether acetate, propylene glycol monopropyl ether acetate, propylene glycol monobutyl ether acetate, propylene glycol monophenyl ether acetate, diethylene glycol monomethyl ether acetate, diethylene glycol monopropyl ether acetate, diethylene glycol monoethyl ether acetate, diethylene glycol monophenyl ether acetate, diethylene glycol monobutyl ether acetate, 2-methoxybutyl acetate, 3-methoxybutyl acetate, 4-methoxybutyl acetate, 3-methyl-3-methoxybutyl acetate, 3-ethyl-3-methoxybutyl acetate, 2-ethoxybutyl acetate, 4-ethoxybutyl acetate, 4-propoxybutyl acetate, 2-methoxypentyl acetate, 3-methoxypentyl acetate, 4-methoxypentyl acetate, 2-methyl-3-methoxypentyl acetate, 3-methyl-3-methoxypentyl acetate, 3-methyl-4-methoxypentyl acetate, 4-methyl-4-methoxypentyl acetate, propylene glycol diacetate, methyl formate, ethyl formate, butyl formate, propyl formate, ethyl carbonate, propyl carbonate, butyl carbonate, methyl pyruvate, ethyl pyruvate, propyl pyruvate, butyl pyruvate, methyl acetoacetate, ethyl acetoacetate, methyl propionate, ethyl propionate, propyl propionate, isopropyl propionate, methyl-3-methoxy propionate, ethyl-3-methoxy propionate, ethyl-3-ethoxy propionate, propyl-3-methoxy propionate, and isopropyl-3-methoxy propionate, propylene carbonate and γ-butyrolactone; amide solvents not having an active hydrogen atom such as N-methyl-2-pyrrolidone, N,N-dimethylacetamide, N,N-dimethylformamide, hexamethylphosphoric triamide and 1,3-dimethyl-2-imidazolidinone; sulfoxides such as dimethylsulfoxide; aliphatic hydrocarbon solvents which may include halogen such as pentane, hexane, octane, decane, 2,2,4-trimethylpentane, 2,2,3-trimethylhexane, perfluorohexane, perfluoroheptane, limonene and pinene; aromatic hydrocarbon solvents such as benzene, toluene, xylene, ethylbenzene, propylbenzene, 1-methylpropylbenzene, 2-methylpropylbenzene, diethylbenzene, ethylmethylbenzene, trimethylbenzene, ethyldimethylbenzene and dipropylbenzene; monohydroxy alcohols such as methanol, ethanol, n-propanol, isopropanol, butanol, isobutanol, 2-methoxyethanol, 2-ethoxyethanol, 3-methyl-3-methoxybutanol, hexanol, cyclohexanol, benzylalcohol and 2-phenoxyethanol; and glycols such as ethylene glycol, propylene glycol, diethylene glycol and dipropylene glycol. It should be noted that in the above preferred examples of the organic solvent (S), organic solvents including an ether bond and an ester bond are classified into esters. These may be used alone or two or more solvents may be used in combination.

[Other Components]

The composition may include various additives such as a surfactant, a defoaming agent, a pH adjuster, and a viscosity adjusting agent as long as the object of the present invention is not defeated. In addition, the composition may include a binder resin for the purpose of improving coating properties and film-forming properties. As the binder resin, various resins can be used and acrylic resin is preferable.

A coating-forming composition is obtained by uniformly mixing the above-described components each in a predetermined amount.

<<Method for Forming Coating>>

The method for forming a coating includes a step of forming a coating by applying a coating-forming composition onto a substrate.

The method for applying a coating-forming composition is not particularly limited as long as a coating with a desired thickness can be formed. The method for applying a coating-forming composition is preferably a spin coating method, an inkjet method and a spray method, and particularly preferably a spin coating method.

The thickness of the coating formed using the composition is not particularly limited. The thickness of the coating is preferably 0.5 nm or more 30 nm or less, more preferably 0.8 nm or more 20 nm or less, and further preferably 1 nm or more 10 nm or less. It should be noted that the thickness of the coating is an average value of thickness at 5 spots or more measured using an ellipsometer.

Substrates used to form the coating are not particularly limited. Examples of substrates include a silicon substrate, a metal substrate such as a copper substrate, a glass substrate, a resin substrate including a resin, e.g. polyester such as polyethylene terephthalate, polycarbonate, polyamide, polyimide, or polyamideimide, and the like.

The substrate may have a three-dimensional structure having a convex portion and a concave portion on the surface on which a coating-forming composition is applied. Even when a substrate has such three-dimensional structure, particularly a three-dimensional structure including a minute nano scale pattern, on the surface thereof, a thin coated film with, for example, 30 nm or less is easily uniformly formed on the three-dimensional structure of the substrate using the above-described coating-forming composition.

The form of the pattern is not particularly limited, and typical examples thereof include a linear or curving line or groove, having a rectangle cross sectional shape, and a hole form.

When a substrate includes a pattern in which a plurality of grooves are repeatedly arranged as a three-dimensional structure on the surface thereof, a space between the patterns can be adapted to a width of 2 μm or less, 1 μm or less, 500 nm or less, or 100 nm or less. The width of the pattern can be adapted to a width of 1 μm or less, 500 nm or less or 200 nm or less. The depth of the groove can be adapted to a height of 1 μm or more, 5 μm or more or 10 μm or more.

It is also preferred that after applying a coating-forming composition to the surface of a substrate, the surface of the substrate be rinsed with an organic solvent. The thickness of a coating can be made more uniform by rinsing the surface of the substrate after forming the coating. Particularly when a substrate has a three-dimensional structure on the surface thereof, the thickness of the coating is easily made thicker at the bottom of the three-dimensional structure (uneven portion). However, the thickness of the coating can be made uniform by rinsing the surface of the substrate after forming the coating.

As the organic solvent used for rinsing, the above-described organic solvents which may be included in the coating-forming composition can be used.

A thin and uniform coating having stability over time can be formed by applying the above-described coating-forming composition onto a substrate in accordance with the above-described method.

EXAMPLES

The present invention will now be described in more detail by way of examples. It should be noted that the present invention is not limited to the following examples.

Examples 1 to 3 and Comparative Example 1

In Examples 1 to 3 and Comparative Example 1, triisopropoxygallium was used as a metal compound (A1). In Examples 1 to 3, B1 to B3 described below were used as an amine compound (B). In Comparative Example 1, an amine compound was not used.

B1: N,N'-di-tert-butylethylenediamine
B2: ethylenediamine
B3: triethylenetetramine.

Triisopropoxygallium was dissolved in dehydrated isopropanol so that the concentration was 0.25 mass %, to obtain a coating-forming composition used in Comparative Example 1. Triisopropoxygallium was dissolved in dehydrated isopropanol so that the concentration was 0.25 mass %, and also an amine compound (B) of type shown in Table 1 was dissolved in dehydrated isopropanol so that the concentration shown in Table 1 was given, to obtain a coating-forming composition used in Examples 1 to 3.

A coating-forming composition is applied to the surface of a silicon substrate having a flat surface using a spin coater at a rotation number of 300 rpm for 60 seconds, followed by rinsing with isopropanol in the spin coater. Subsequently, the substrate was retained on a 100° C. hot plate for a minute, and then put on a 200° C. hot plate. The substrate was retained at 200° C. for 1 minute to form a coating. The thickness of the formed coating was measured and the existence of foreign substances was observed. The thickness of the coating and the existence of foreign substances are shown in Table 1.

TABLE 1

| | Component (B) | | Thickness of coating (nm) | Foreign substance |
|---|---|---|---|---|
| | Type | Concentration (mass %) | | |
| Example1 | B1 | 0.07 | 8.1 | no |
| Example2 | B2 | 0.06 | 4.6 | no |
| Example3 | B3 | 0.07 | 6.2 | no |
| Comparative Example1 | — | — | 8.1 | yes |

It is found from Table 1 that, when using a coating-forming composition including an amine compound (B) together with a metal compound (A1) to form a coating, a thin coating not having foreign substances can be formed well. On the other hand, in Comparative Example 1 in which a coating-forming composition including only a metal compound (A1) was used, foreign substances were generated in a coating.

In addition, changes in the thickness of the coatings formed in Examples 1 to 3 were confirmed over time after the formation of the coatings; however, a significant decrease in thickness was not confirmed even 24 hours after the formation of the coatings. Therefore, the coatings with good stability were formed in Examples 1 to 3.

What is claimed is:

1. A method for forming a coating, the method comprising:
    forming a coating by applying a coating-forming composition onto a substrate,
    wherein the composition is a solution comprising a metal compound (A1) and/or a halogen-containing compound (A2), and an amine compound (B),
    the metal compound (A1) comprises one or more metal elements selected from period 2 elements to period 6 elements in a periodic table,
    the metal compound (A1) comprises an organometallic compound or a metal hydroxide,
    the amine compound (B) is an aliphatic amine compound comprising 2 or more nitrogen atoms, and
    the coating has a thickness of 0.5 nm or more and 30 nm or less.

2. The method for forming a coating comprising a metal compound according to claim 1, wherein the organometallic compound is one or more selected from the group consisting of metal alkoxides, alkyl metal compounds and organometallic complexes.

3. The method for forming a coating comprising a metal compound according to claim 1, wherein the metal compound (A1) comprises one or more metal elements selected from the group consisting of Ga, Al, Mg, Hf, Ti, W, Co, Fe, Mo, Ta, In, Sn, Zn, Cu, Ni, Ru, Mn, K, Li, Na, Ca, Sr, Ba, La, Bi and Zr, and the halogen-containing compound (A2) comprises one or more elements selected from the group consisting of F, I and Br.

4. A method for forming a coating, the method comprising:
    forming a coating by applying a coating-forming composition onto a substrate, wherein
    the composition is a solution consisting of a metal compound (A1) and/or a halogen-containing compound (A2), and an aliphatic amine compound comprising 2 or more nitrogen atoms (B), and
    the halogen-containing compound (A2) comprises, as a halogen atom, at least one selected from the group consisting of F, I, and Br,
    the halogen-containing compound (A2) is a halogen-containing silane compound,
    the metal compound (A1) comprises one or more metal elements selected from period 2 elements to period 6 elements in a periodic table,
    the metal compound (A1) comprises an organometallic compound, and
    the organometallic compound is at least one selected from the group consisting of metal alkoxides and alkyl metal compounds.

5. The method for forming a coating comprising a metal compound according to claim 1, wherein the composition is a solution consisting of the metal compound (A1) and/or the halogen-containing compound (A2), the amine compound (B), and an organic solvent (S).

6. The method for forming a coating comprising a metal compound according to claim 4, wherein the coating has a thickness of 0.5 nm or more and 30 nm or less.

* * * * *